United States Patent
Amei

(10) Patent No.: US 10,110,123 B2
(45) Date of Patent: Oct. 23, 2018

(54) DC-DC CONVERTER

(71) Applicant: SMK Corporation, Tokyo (JP)

(72) Inventor: Toshihiro Amei, Tokyo (JP)

(73) Assignee: SMK Corporation, Tokyo (JP)

( * ) Notice: Subject to any disclaimer, the term of this patent is extended or adjusted under 35 U.S.C. 154(b) by 290 days.

(21) Appl. No.: 15/169,746

(22) Filed: Jun. 1, 2016

(65) Prior Publication Data

US 2016/0276929 A1  Sep. 22, 2016

Related U.S. Application Data

(63) Continuation of application No. PCT/JP2014/076482, filed on Sep. 26, 2014.

(30) Foreign Application Priority Data

Jun. 23, 2014 (JP) ................................. 2014-127980

(51) Int. Cl.
| | | |
|---|---|---|
| *H02H 3/00* | (2006.01) | |
| *H02M 3/156* | (2006.01) | |
| *H02H 7/12* | (2006.01) | |
| *H02M 1/08* | (2006.01) | |
| *H02M 1/32* | (2007.01) | |

(52) U.S. Cl.
CPC .......... *H02M 3/156* (2013.01); *H02H 7/1213* (2013.01); *H02M 1/08* (2013.01); *H02M 1/32* (2013.01); *H02M 2001/327* (2013.01)

(58) Field of Classification Search
USPC .............................. 361/18, 86–87, 93.7–93.9
See application file for complete search history.

(56) References Cited

U.S. PATENT DOCUMENTS

| | | | |
|---|---|---|---|
| 7,068,023 B2 * | 6/2006 | Okada ..................... | G05F 1/575 323/285 |
| 7,405,495 B2 * | 7/2008 | Guillarme ............... | H02M 1/32 307/44 |
| 2005/0024032 A1 | 2/2005 | Yamamoto | |

(Continued)

FOREIGN PATENT DOCUMENTS

| | | |
|---|---|---|
| JP | H9-163722 A | 6/1997 |
| JP | 2002-51551 A | 2/2002 |
| JP | 2004-328945 A | 11/2004 |

(Continued)

OTHER PUBLICATIONS

International Search Report for International Application No. PCT/JP2014/076482, issued by the Japan Patent Office dated Dec. 16, 2014.

(Continued)

*Primary Examiner* — Danny Nguyen

(57) ABSTRACT

In a DC-DC converter, a voltage at a connecting point where a switching transistor is connected to an inductor is compared with a threshold voltage set within a variation range of the voltage at the connecting point during switching operation of the switching transistor. When a polarity in which the voltage at the connecting point and the threshold voltage are compared does not vary in a detection time longer than the predetermined period of a driving circuit, the switching transistor is determined to be operating in an active state with a risk of heat generation.

5 Claims, 9 Drawing Sheets

(56) References Cited

U.S. PATENT DOCUMENTS

2009/0066304 A1  3/2009  Nakabayashi

FOREIGN PATENT DOCUMENTS

| JP | 4452384 B2 | 4/2010 |
| JP | 2011-182519 A | 9/2011 |
| JP | 2011-193549 A | 9/2011 |

OTHER PUBLICATIONS

Office Action issued for counterpart Japanese Application 2014-127980, issued by the Japan Patent Office dated Apr. 1, 2015.

* cited by examiner

DC-DC CONVERTER

CROSS REFERENCE TO RELATED APPLICATION

The contents of the following Japanese patent application and International patent application are incorporated herein by reference, Japanese Patent Application No. 2014-127980 filed on Jun. 23, 2014, and International Patent Application No. PCT/JP2014/76482 filed on Sep. 26, 2014.

FIELD

The present invention relates to a DC-DC converter for converting a direct current voltage to a stable direct current voltage suitable for a load, more particularly, to a DC-DC converter for interrupting a current flowing in an inductor by a switching operation of a switching transistor to convert to a direct current output voltage different from an input voltage.

BACKGROUND

A DC-DC converter converts a direct current input voltage to a different direct current output voltage and outputs the direct current output voltage to a load. A DC-DC converter is included in each electronic circuit operating with different direct current voltages in various electronic products such as laptop computers, and converts an input voltage to a stable direct current voltage required by the electronic circuit and outputs the direct current voltage. DC-DC converters are classified into insulated DC-DC converters and non-insulated DC-DC converters based on operating principle. An insulated DC-DC converter increases and decreases an input voltage by a transformer. A non-insulated DC-DC converter interrupts a current flowing in an inductor by a switching transistor, and converts a direct current input voltage to a direct current output voltage with different voltage and polarity. In electronic circuits with similar input voltage and output voltage, non-insulated DC-DC converters are used which can be made of relatively simple circuit elements.

Non-insulated DC-DC converters are further classified into step-up DC-DC converters that increase a direct current input voltage to generate a direct current output voltage, step-down DC-DC converters that decrease a direct current input voltage to generate a direct current output voltage, and inverted DC-DC converters that invert the polarity of a direct current input voltage to generate a direct current output voltage.

A related step-down DC-DC converter 100 will be described below with reference to FIG. 7. A direct current input power supply 30 generates a direct input voltage Vi between a high-tension side supply terminal 30a and a low-tension side supply terminal 30b. A diode D1 of which forward direction is from a low-tension side to a high-tension side and a switching transistor Tr1 are serially connected between the high-tension side supply terminal 30a and the low-tension side supply terminal 30b to form a closed circuit as illustrated in the figure.

A connecting point A1 between the diode D1 and the switching transistor Tr1 is connected to a high-tension side output line 32 with the other side being a high-tension side output terminal 32a via an inductor L1, and a connecting point between the diode D1 and the low-tension side supply terminal 30b is connected to a low-tension side output line 33 with the other side being a low-tension side output terminal 33a. A capacitor C1 for outputting a stable output voltage Vo to a load RL connected between the high-tension side output terminal 32a and the low-tension side output terminal 33a is connected between the high-tension side output line 32 and the low-tension side output line 33.

The switching transistor Tr1 is an FET (field effect transistor) for example, and its switching is controlled by a driving signal output to a gate of the switching transistor Tr1 from a constant voltage control circuit 40. During the switching transistor Tr1 is controlled to be closed (controlled to be on) and is operating in a saturation state, a current flows from the direct current input power supply 30 to the inductor L1 to charge the capacitor C1, but a charging voltage of the capacitor C1 that is the output voltage Vo becomes a voltage lower than the input voltage Vi by self-induction of the inductor L1. During the switching transistor Tr1 is controlled to be open (controlled to be off) and is operating in a cut-off state, electrical energy stored in the inductor L1 becomes a charging current that circulates via the diode D1 to charge the capacitor C1 and maintains a charging voltage of the capacitor C1 that is the output voltage Vo.

Since the output voltage Vo can be controlled by closing control time of the switching transistor Tr1 in a unit time, the constant voltage control circuit 40 negatively feeds back an on-duty of a driving signal that closes the switching transistor Tr1 from the output voltage Vo, and performs constant-voltage control of the output voltage Vo so that the output voltage Vo becomes an operating voltage of the load RL. Therefore, the constant voltage control circuit 40 includes a pair of divider resistors R1 and R2 connected between the high-tension side output line 32 and the low-tension side output line 33, and a voltage of a connecting point of the divider resistors R1 and R2 and a reference power supply voltage Vref adjusted to a predetermined electric potential based on an operating voltage of the load RL are compared by a comparator 41 and supplied to a pulse width modulator PWM. The pulse width modulator PWM modulates a pulse width of a transmission signal with a certain period output from a transmitter OSC by a comparison signal of the comparator 41 to output the transmission signal to a driving circuit 42, and the driving circuit 42 outputs a driving signal of which on-duty is adjusted in accordance with the comparison signal of the comparator 41 to a gate of the switching transistor Tr1. Accordingly, when the output voltage Vo is higher than an operating voltage of the load RL for example, since a driving signal with lowered on-duty is output from the driving circuit 42 to the gate of the switching transistor Tr1 and on-control time in the unit time is shortened, the output voltage Vo is lowered. In contrast, when the output voltage Vo is lower than the operating voltage of the load RL, since a driving signal with increased on-duty is output to the gate of the switching transistor Tr1 and on-control time in the unit time is extended, the output voltage Vo is increased. Therefore, the output voltage Vo is controlled to be a constant certain operating voltage different for each of the loads RL.

Generally, a DC-DC converter of this kind is provided with a protection circuit for detecting decrease in an output voltage and abnormal increase in an output current to interrupt the output lines 32 and 33 since a circuit of the load RL may be broken or fire may occur in an unexpected abnormal operation state such as overload and short circuit of an output line (PATENT LITERATURES 1 to 3).

CITATION LIST

Patent Literature

PATENT LITERATURE 1: Japanese Patent No. 4452384
PATENT LITERATURE 2: Japanese Patent Application Publication No. 9-163722
PATENT LITERATURE 3: Japanese Patent No. 4651428

SUMMARY

Technical Problem

On the other hand, there have been cases in which the pulse width modulator PWM or the like of the constant voltage control circuit 40 is broken by some reasons such as lightning and a driving signal with constant electric potential to set the switching transistor Tr1 to an active state is output from the driving circuit 42 to a gate (base) of the switching transistor Tr1. When the switching transistor Tr1 operates in an active state, the DC-DC converter 100 illustrated in FIG. 7 functions as a series regulator (dropper circuit) that closes (turns on) the switching transistor Tr1 all time, consumes input power by using on-resistance of the switching transistor Tr1, and converts an input voltage to an output voltage lower than the input voltage.

However, in a DC-DC converter that highly efficiently converts an input voltage to a direct current output voltage with switching loss in the switching transistor Tr1 minimized as much as possible, thermal energy generated by on-resistance cannot be diffused unlike a series regulator with a power MOS or a power transistor with countermeasure for heat dissipation. Therefore, there has been a risk of serious accident such as fire due to heat generation of the switching transistor Tr1. For example, if a current of 1 A continuously flows in the switching transistor Tr1 in an active state with the input voltage Vin being 10 V and the output voltage Vo being 5 V, the switching transistor Tr1 generates heat due to thermal energy equivalent to 5 W.

Moreover, since an output voltage or an output current do not largely vary from the set value even if the switching transistor Tr1 operates in an active state, a protection circuit disclosed in PATENT LITERATURES 1 to 3 for interrupting the output lines 32 and 33 from these abnormal values cannot detect the abnormal operation. Furthermore, since many DC-DC converters are provided in a case of an electronic product, abnormal heat generation of the switching transistor Tr1 cannot be detected from outside visually or sensuously, and there has been a possibility that the abnormal operation cannot be found until ignition is caused inside the electronic product.

Although it is a very rare case that a part of the constant voltage control circuit 40 is broken and a driving signal for making the switching transistor Tr1 an active state is continuously output as described above, there has been an extremely serious problem that, once such an accident occurs, a related DC-DC converter cannot detect this to cause a fire incident with high probability.

The present invention has been developed in consideration of the problem described above, and its purpose is to provide a DC-DC converter for detecting an abnormal operation of the switching transistor Tr1 in an active state with a simple circuit structure.

Furthermore, another purpose of the present invention is to provide a DC-DC converter for stopping an input from a direct current input power supply before abnormal heat generation of the switching transistor Tr1 operating in an active state occurs to prevent occurrence of fire in advance without changing a structure of an existing DC-DC converter.

Solution to Problem

A DC-DC converter according to a first aspect of the invention to accomplish the purpose described above includes: a switching transistor serially connected to a direct current input power supply and forming a closed circuit with the direct current input power supply; a driving circuit for outputting a driving signal to open and close the switching transistor in a predetermined period to a control terminal of the switching transistor; a capacitor connected between a pair of a high-tension side output line and a low-tension side output line connected to a load; an inductor in which a current flowing from the direct current input power supply is interrupted by switching operation of the switching transistor and for converting an output voltage between the pair of the high-tension side output line and the low-tension side output line to a direct current voltage different from an input voltage of the direct current input power supply; a constant voltage control circuit for controlling a close time of the switching transistor by the driving signal in accordance with the output voltage between the pair of the high-tension side output line and the low-tension side output line to control the output voltage to a constant voltage; a comparator for comparing a voltage Vd at a connecting point A where the switching transistor is connected to the inductor with a threshold voltage Vth arbitrarily set within a variation range of the voltage Vd at the connecting point A during switching operation of the switching transistor; and an abnormality determination circuit that determines as operation of the switching transistor in an active state when a polarity in which the voltage Vd and the threshold voltage Vth are compared by the comparator does not vary in a detection time Td longer than the predetermined period of the driving signal.

The voltage Vd at the connecting point A where the switching transistor is connected to the inductor varies in the variation range during normal switching operation of the switching transistor with repetition of a saturation state and a cut-off state, and the polarity in which the comparator compares the voltage Vd with the threshold voltage Vth varies within the predetermined period in which the switching transistor opens and closes. When the switching transistor operates in an active state, since an input voltage Vi becomes almost constant and the voltage Vd at the connecting point A also maintains almost constant electric potential, the polarity in which the comparator compares the voltage Vd with the threshold voltage Vth does not vary in the detection time Td longer than the predetermined period in which the switching transistor opens and closes. Therefore, the switching transistor is determined to be operating in normal switching operation and operation in an active state can be determined.

The DC-DC converter according to a second aspect of the invention further includes a protection circuit for opening an emergency stop switch connected between the direct current input power supply and the switching transistor of the closed circuit when the abnormality determination circuit determines as operation of the switching transistor in an active state.

Since a current flowing from the direct current input power supply to the switching transistor is stopped when the abnormality determination circuit determines as operation of the switching transistor in an active state, heat generation of the switching transistor due to operation in an active state is prevented.

The DC-DC converter according to a third aspect of the invention is a step-down DC-DC converter in which the inductor converts the output voltage between the pair of the high-tension side output line and the low-tension side output line to a direct current voltage lower than the input voltage of the direct current input power supply, and the threshold voltage Vth is set to any electric potential between −Vf and +Vi when diode drop of a diode connected between a low-tension side terminal of the direct current input power supply and the switching transistor of the closed circuit with a forward direction being a direction from the low-tension side terminal to the switching transistor is Vf and an input voltage of the diode is Vi.

The voltage Vd at the connecting point A where the switching transistor is connected to the inductor is +Vi in a saturation state when the switching transistor is closed and −Vf in a cut-off state when the switching transistor is opened. During normal switching operation of the switching transistor, the voltage Vd alternately varies between −Vf and +Vi in the predetermined period and maintains almost constant electric potential when the switching transistor operates in an active state. Therefore, since the polarity in which voltage Vd is compared with the threshold voltage Vth set to any electric potential between −Vf and +Vi does not vary in the detection time Td longer than the predetermined period, the abnormality determination circuit can determine as normal switching operation and as operation in an active state.

The DC-DC converter according to a fourth aspect of the invention is a step-up DC-DC converter in which the inductor converts the output voltage between the pair of the high-tension side output line and the low-tension side output line to a direct current voltage higher than the input voltage of the direct current input power supply, and the threshold voltage Vth is set to any electric potential between a grounding electric potential and +Vi+Vfb when an input voltage is Vi and an induced voltage generated in the inductor by opening the switching transistor is Vfb.

The voltage Vd at the connecting point A where the switching transistor is connected to the inductor is the grounding electric potential in a saturation state when the switching transistor is closed and Vi+Vfb in a cut-off state when the switching transistor is opened. The voltage Vd alternately varies between the grounding electric potential and Vi+Vfb in the predetermined period when the switching transistor is in normal switching operation, and maintains almost constant electric potential when the switching transistor operates in an active state. Therefore, since the polarity in which the voltage Vd is compared with the threshold voltage Vth set to any electric potential between the grounding electric potential and Vi+Vfb does not vary in the detection time Td longer than the predetermined period, the abnormality determination circuit can determine as normal switching operation and as operation in an active state.

The DC-DC converter according to a fifth aspect of the invention is an inverted DC-DC converter in which the inductor converts the output voltage between the pair of the high-tension side output line and the low-tension side output line to a direct current voltage with a polarity different from the input voltage of the direct current input power supply, and the threshold voltage Vth is set to any electric potential between −Vfb and +Vi when an induced voltage generated in the inductor by opening the switching transistor is Vfb and an input voltage is Vi.

The voltage Vd at the connecting point A where the switching transistor is connected to the inductor is +Vi in a saturation state when the switching transistor is closed and −Vfb which is an induced voltage of the inductor in a cut-off state when the switching transistor is opened. The voltage Vd alternately varies between −Vfb and +Vi in the predetermined period during normal switching operation of the switching transistor, and maintains almost constant electric potential when the switching transistor operates in an active state. Therefore, since the polarity in which the voltage Vd is compared with the threshold voltage Vth set to any electric potential between −Vfb and +Vi does not vary in the detection time Td longer than the predetermined period, the abnormality determination circuit can determine as normal switching operation and as operation in an active state.

According to the first aspect of the invention, even if a part of the constant voltage control circuit or the switching transistor itself has a failure and the switching transistor operates in an active state, it is possible to determine the operation in the active state as normal switching operation. Therefore, it is possible to take a measure to prevent a fire accident in advance before a fire occurs such as to notify the user of a risk of heat generation of the switching transistor and to stop operation of the DC-DC converter.

In addition, since it is possible to detect operation of the switching transistor in an active state only by monitoring the voltage Vd at the connecting point A where the switching transistor is connected to the inductor, it is possible to detect abnormal operation that cannot be detected by a related protection circuit only by adding the comparator and the abnormality determination circuit to an existing DC-DC converter.

According to the second aspect of the invention, it is possible to stop heat generation of the switching transistor and to prevent occurrence of a fire in advance before the switching transistor abnormally generates heat.

According to the third aspect of the invention, even if the switching transistor of the step-down DC-DC converter operates in an active state, it is possible to determine the operation in the active state as normal switching operation. Therefore, it is possible to take a measure to prevent a fire accident in advance before a fire occurs such as to notify the user of a risk of heat generation of the switching transistor and to stop operation of the step-down DC-DC converter.

According to the fourth aspect of the invention, even if the switching transistor of the step-up DC-DC converter operates in an active state, it is possible to determine the operation in the active state as normal switching operation. Therefore, it is possible to take a measure to prevent a fire accident in advance before a fire occurs such as to notify the user of a risk of heat generation of the switching transistor and to stop operation of the step-up DC-DC converter.

According to the fifth aspect of the invention, even if the switching transistor of the inverted DC-DC converter operates in an active state, it is possible to determine the operation in the active state as normal switching operation. Therefore, it is possible to take a measure to prevent a fire accident in advance before a fire occurs such as to notify the user of a risk of heat generation of the switching transistor and to stop operation of the inverted DC-DC converter.

DESCRIPTION OF EMBODIMENTS

Figure 1:
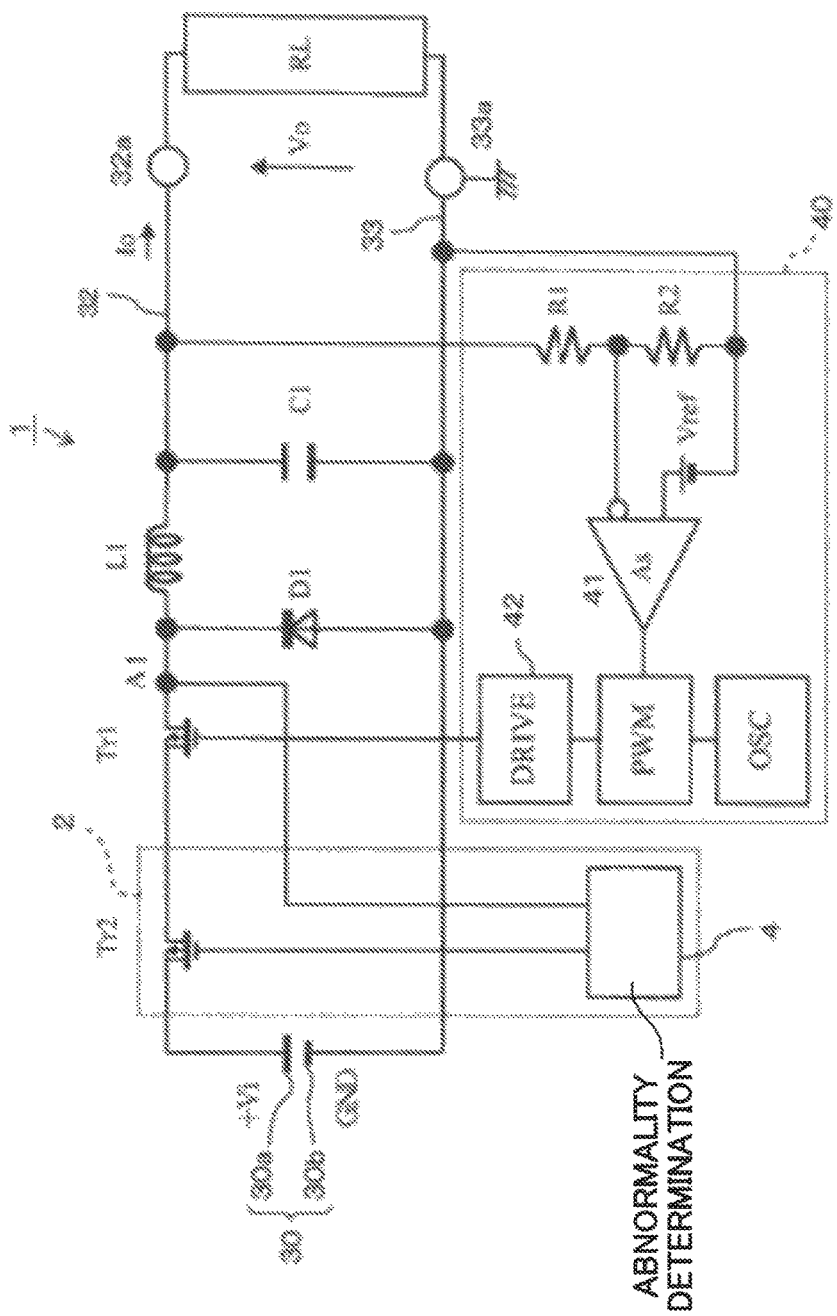
FIG. 1 is a circuit diagram of a step-down DC-DC converter 1 according to one embodiment of the present invention.
Figure 7:
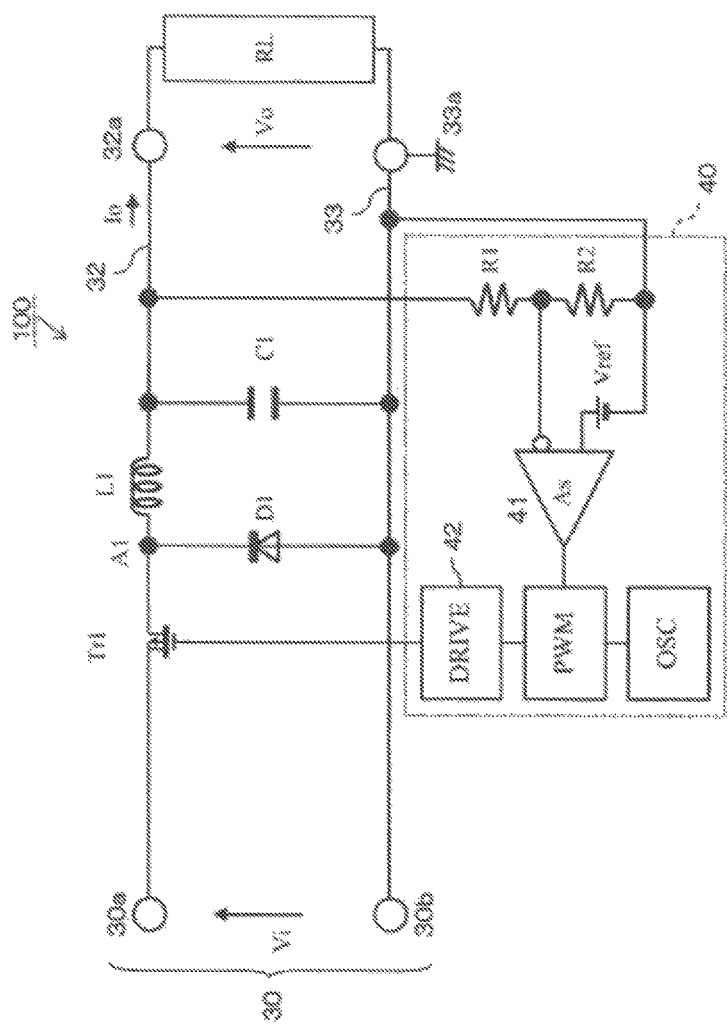
FIG. 7 is a related circuit diagram of a DC-DC converter 100.

A DC-DC converter according to one embodiment of the present invention is a step-down DC-DC converter 1 for converting a direct current input voltage Vi of 12 V to a direct current output voltage Vo of 5 V, and the step-down DC-DC converter 1 will be described below with reference to FIGS. 1 to 4. FIG. 1 is a circuit diagram of the step-down DC-DC converter 1. As apparent in comparison with a related DC-DC converter 100 illustrated in FIG. 7, the step-down DC-DC converter 1 includes a protection circuit 2 and a switching transistor Tr2 as an emergency stop switch connected between a high-tension side supply terminal 30a and a switching transistor Tr1 in addition to the elements of the DC-DC converter 100 without changing the basic structure of the DC-DC converter 100. Therefore, since the main circuit structure is the same as the related step-down DC-DC converter 100 described above, the elements that function substantially the same as or similar to the elements in the step-down DC-DC converter 100 are given the same reference numerals and their detailed description will be omitted.

A direct current input power supply 30 is an unstable power supply in which the direct current input voltage Vi varies by about 10%. A closed circuit is formed by serially connecting the switching transistor Tr2, the switching transistor Tr1 as a main switching element, and a diode D1 of which forward direction is from the low-tension side to the high-tension side between the high-tension side supply terminal 30a of +12 V and a low-tension side supply terminal 30b of 0 V.

The switching transistors Tr1 and Tr2 are P-channel FETs (field effect transistors). A gate of the switching transistor Tr1 is connected to a driving circuit 42 of a constant voltage control circuit 40 formed by a control IC, and on and off of the switching transistor Tr1 are controlled by a driving signal output from the driving circuit 42. A gate of the switching transistor Tr2 is connected to an output of an RS flip-flop circuit 5 of the protection circuit 2 described later, and on and off of the switching transistor Tr2 are controlled by an output signal of the RS flip-flop circuit 5. Here, on control of the switching transistors Tr1 and Tr2 is to close between a drain and a source when the switching transistor Tr1 or Tr2 is in a saturation state. Off control is to open between a drain and a source when the switching transistor Tr1 or Tr2 is in a cut-off state.

Figure 3:
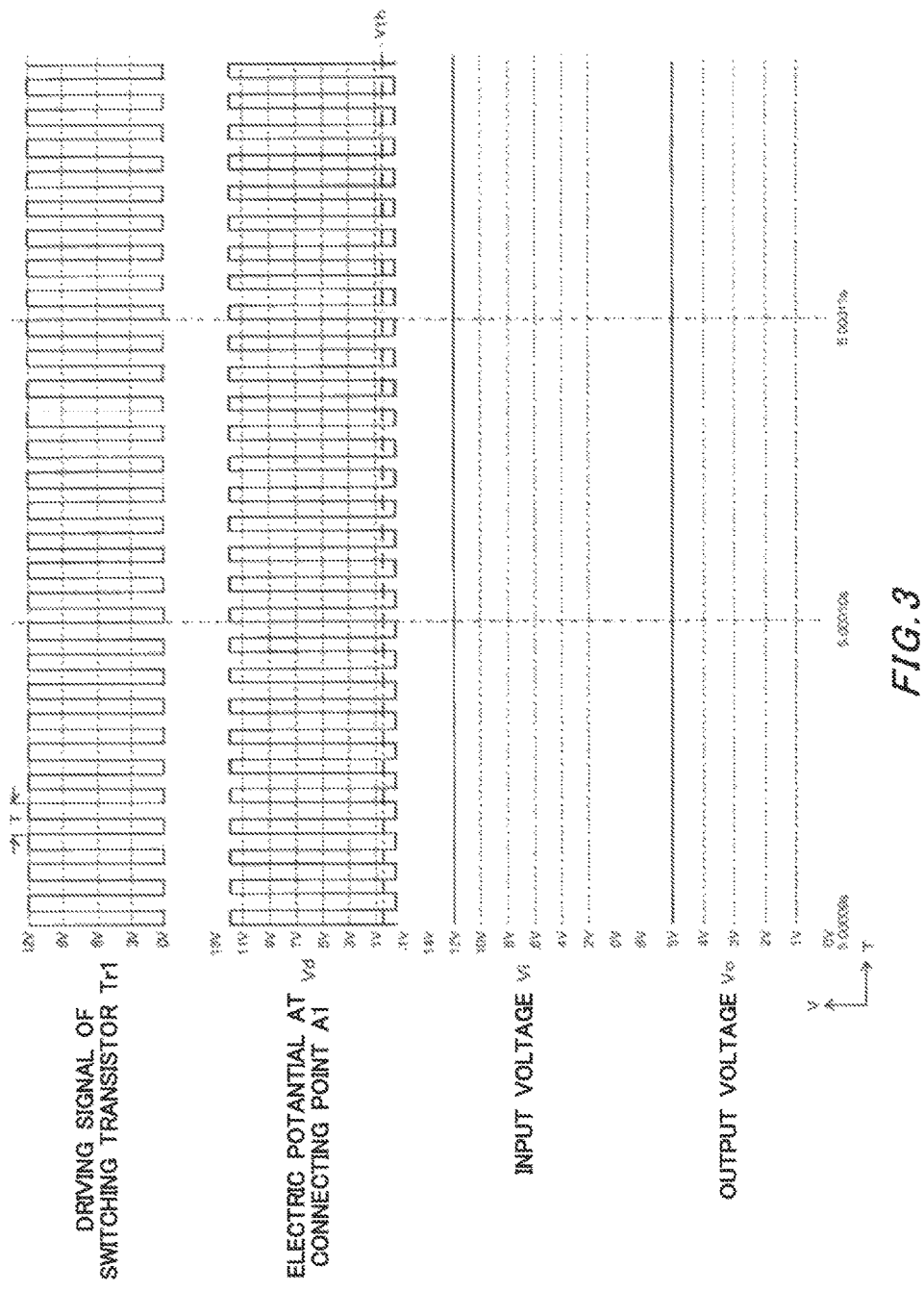
FIG. 3 is a waveform chart showing waveforms of each part in the DC-DC converter 1 in which a switching transistor Tr1 is in normal switching operation.

As shown in FIG. 3, a driving signal output from the driving circuit 42 is a pulse signal that repeats on-time of 0 V and off-time of +12 V in a fixed period T of 1 μsec for example. During a driving signal of +0 V is output from the driving circuit 42 to the gate of the switching transistor Tr1, the switching transistor Tr1 is controlled to be on and a charging current for charging a capacitor C1 flows from the direct current input power supply 30 to an inductor L1. A charging voltage of the capacitor C1 that is the output voltage Vo during the on-control time becomes a voltage of +5 V lower than the input voltage Vi of +12 V by self-induction of the inductor L1.

When a driving signal of +12 V is output from the driving circuit 42 to the gate of the switching transistor Tr1, the switching transistor Tr1 is controlled to be off. During the off-control time, electrical energy accumulated in the inductor L1 becomes a charging current that circulates through the diode D1 to charge the capacitor C1 with the same polarity as the charging voltage, and the output voltage Vo (charging voltage of the capacitor C1) lowered due to power consumption of a load RL is kept to be +5 V.

Constant voltage control is performed by the constant voltage control circuit 40 so that the output voltage Vo becomes an operating voltage of the load RL. The constant voltage control circuit 40 includes a pair of divider resistors R1 and R2 connected between a high-tension side output line 32 and a low-tension side output line 33, a comparator 41 for comparing a voltage at the connecting point of the divider resistors R1 and R2 with a reference power supply voltage Vref adjusted to be a predetermined electric potential based on the operating voltage of the load RL, a pulse width modulator PWM for modulating the pulse width of a pulse signal with a fixed frequency of 1 MHz output from a transmitter OSC by an output of the comparator 41, and the driving circuit 42 for outputting a modulated signal output from the pulse width modulator PWM to the gate of the switching transistor Tr1 as a driving signal.

When the output voltage Vo is higher than the operating voltage of the load RL, on-time of the pulse signal in the fixed period T of 1 μsec is shortened by the pulse width modulator PWM, and a driving signal with lowered on-duty is output to the gate of the switching transistor Tr1. As a result, on-control time in a unit time of the switching transistor Tr1 is shortened, and the output voltage Vo is lowered. In contrast, when the output voltage Vo is lower than the operating voltage of the load RL, since a driving signal with increased on-duty is output to the gate of the switching transistor Tr1 and on-control time in the unit time is extended, the output voltage Vo increases and the output voltage Vo is controlled to be a constant voltage of a predetermined operating voltage different for each load RL.

FIG. 3 shows signal waveforms of each part in the step-down DC-DC converter 1 that controls the output voltage Vo to be a constant voltage of 5 V that is the operating voltage of the load RL by the constant voltage control circuit 40 that operates in a normal way. In an example in the figure, a driving signal with on-duty of 44% is output to the gate of the switching transistor Tr1 and switching of the switching transistor Tr1 is controlled, and the direct current input voltage Vi of 12 V is converted to the output voltage Vo of 5 V. An electric potential at the connecting point A1 between the switching transistor Tr1 and the inductor L1 during normal switching operation of the switching transistor Tr1 becomes +12 V equivalent to an electric potential of the high-tension side supply terminal 30a during the switching transistor Tr1 is controlled to be on, and becomes −0.5 V that is obtained by decreasing from a grounding electric potential of the low-tension side supply terminal 30b by diode fall amount Vf by the diode D1 of about 0.5 V during the switching transistor Tr1 is controlled to be off, and varies between −0.5 V and +12 V.

Figure 2:
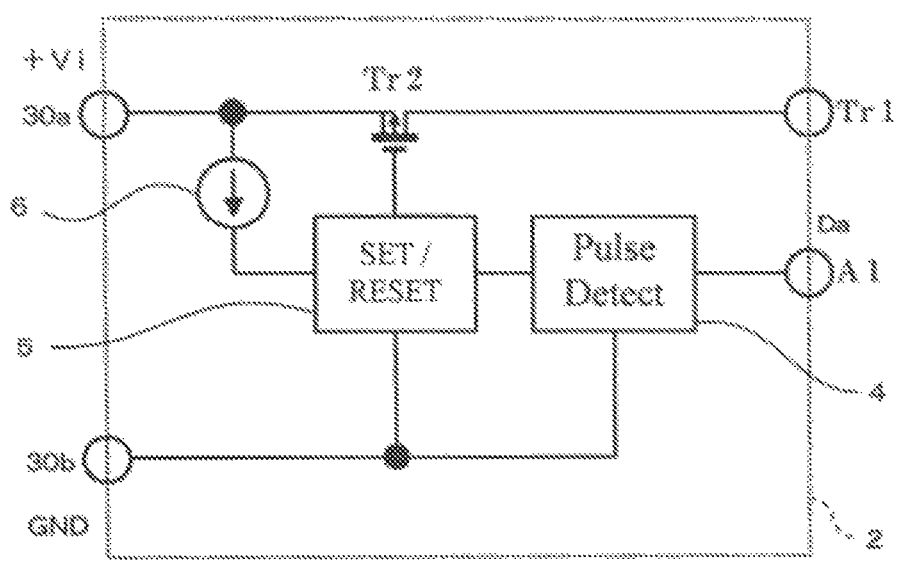
FIG. 2 is a block diagram of a protection circuit 2.

As illustrated in FIGS. 1 and 2, the protection circuit 2 according to the present embodiment includes an abnormality determination circuit 4 in which a detection terminal Da is connected to the connecting point A1 for monitoring an electric potential of the connecting point A1 between the switching transistor Tr1 and the inductor L1, and the RS flip-flop circuit 5 connected to an output of the abnormality determination circuit 4. The abnormality determination circuit 4 and the RS flip-flop circuit 5 are connected between the low-tension side supply terminal 30b and a constant current circuit 6 connected to the high-tension side supply terminal 30a, and operates with the direct current input power supply 30 converted to a stable electric potential by the constant current circuit 6 as a power supply.

The abnormality determination circuit 4 includes a comparator (not illustrated) that compares a voltage Vd at the connecting point A1 with a threshold voltage Vth arbitrarily set in a variation range of the voltage Vd during switching operation of the switching transistor Tr1. In the present embodiment, as the voltage Vd at the connecting point A1 varies between 0.5 V and +5 V, the threshold voltage Vth is set to be +0.5 V that is between them.

Figure 4:
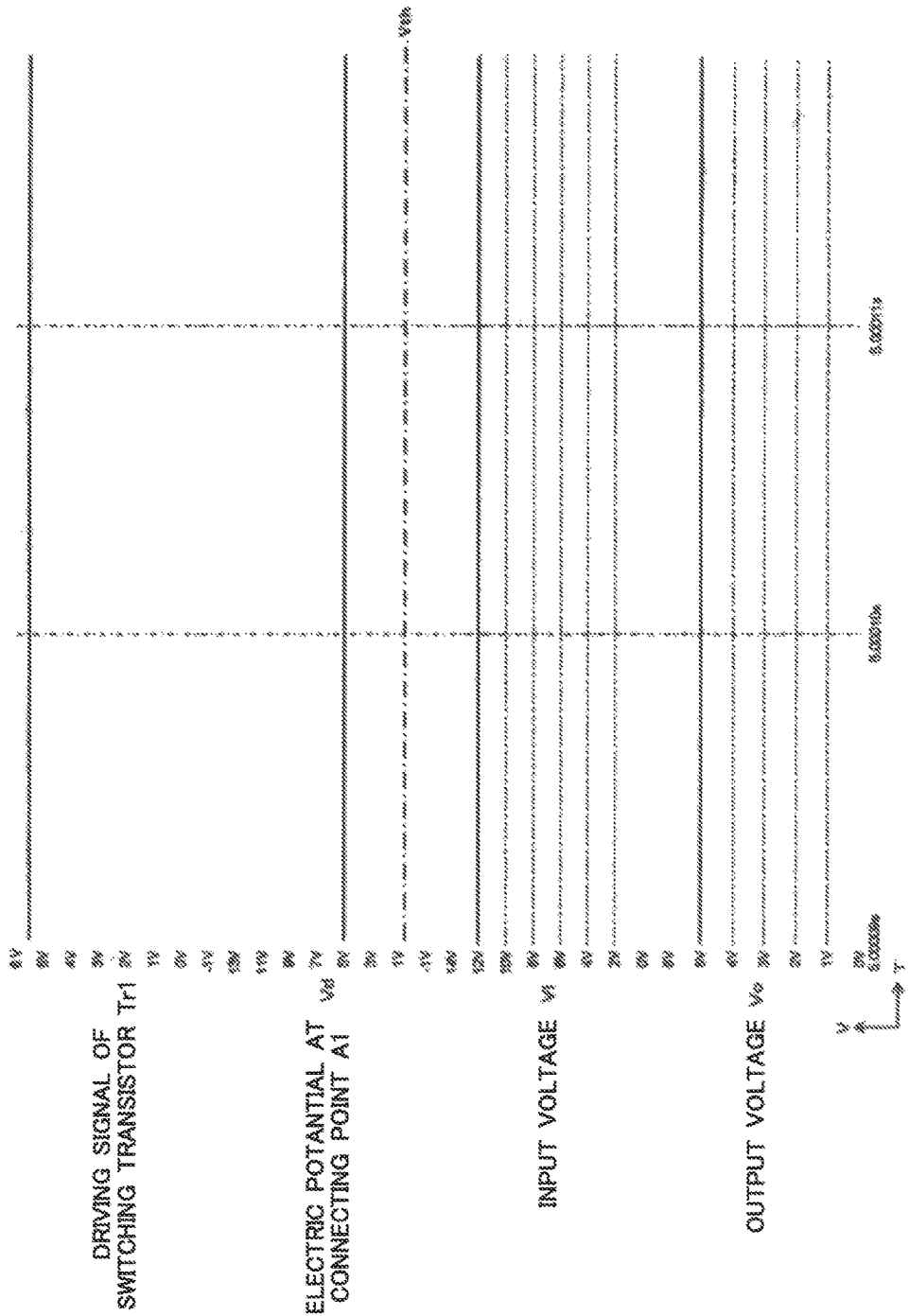
FIG. 4 is a waveform chart showing waveforms of each part in the DC-DC converter 1 in which the switching transistor Tr1 is in abnormal operation in an active state.

During normal switching operation of the switching transistor Tr1, a polarity of the comparator is inverted in the fixed period T of at least 1 μsec. On the other hand, when the pulse width modulator PWM or the like is broken for some reasons and a driving signal output to the gate of the switching transistor Tr1 becomes a constant electric potential as shown in FIG. 4, because the switching transistor Tr1 abnormally operates in an active state and the direct current input voltage Vi is an almost constant electric potential, the voltage Vd at the connecting point A1 also becomes a constant electric potential and a polarity of an output of the comparator is not inverted in the fixed period T. Then, the abnormality determination circuit 4 determines that the operation is an abnormal operation in an active state if the polarity of the output of the comparator is never inverted in the detection time Td of 2 μsec longer than the fixed period T of the driving circuit 42, and a normal output of L level is inverted to H level to be output to a set input of the RS flip-flop circuit 5.

The RS flip-flop circuit 5 outputs an output signal of L level to the gate of the switching transistor Tr2, turns on the switching transistor Tr2, and continues the normal operation by the switching operation of the switching transistor Tr1 after a reset signal of L level is input until a set signal of H level is input from the abnormality determination circuit 4. On the other hand, the RS flip-flop circuit 5 outputs an output signal of H level to the gate of the switching transistor Tr2 and turns off the switching transistor Tr2 after a set signal of H level is input from the abnormality determination circuit 4 until a reset signal of L level is input next. As a result, a current flowing from the direct current input power supply 30 to the switching transistor Tr1 is interrupted, and heat generation of the switching transistor Tr1 due to operation in an active state is stopped.

When a problem of an accident due to the switching transistor Tr1 in an active state is resolved and switching operation can be performed, a reset signal of L level is input to the RS flip-flop circuit 5 to turn on the switching transistor Tr2 to restore normal operation.

Figure 5A:
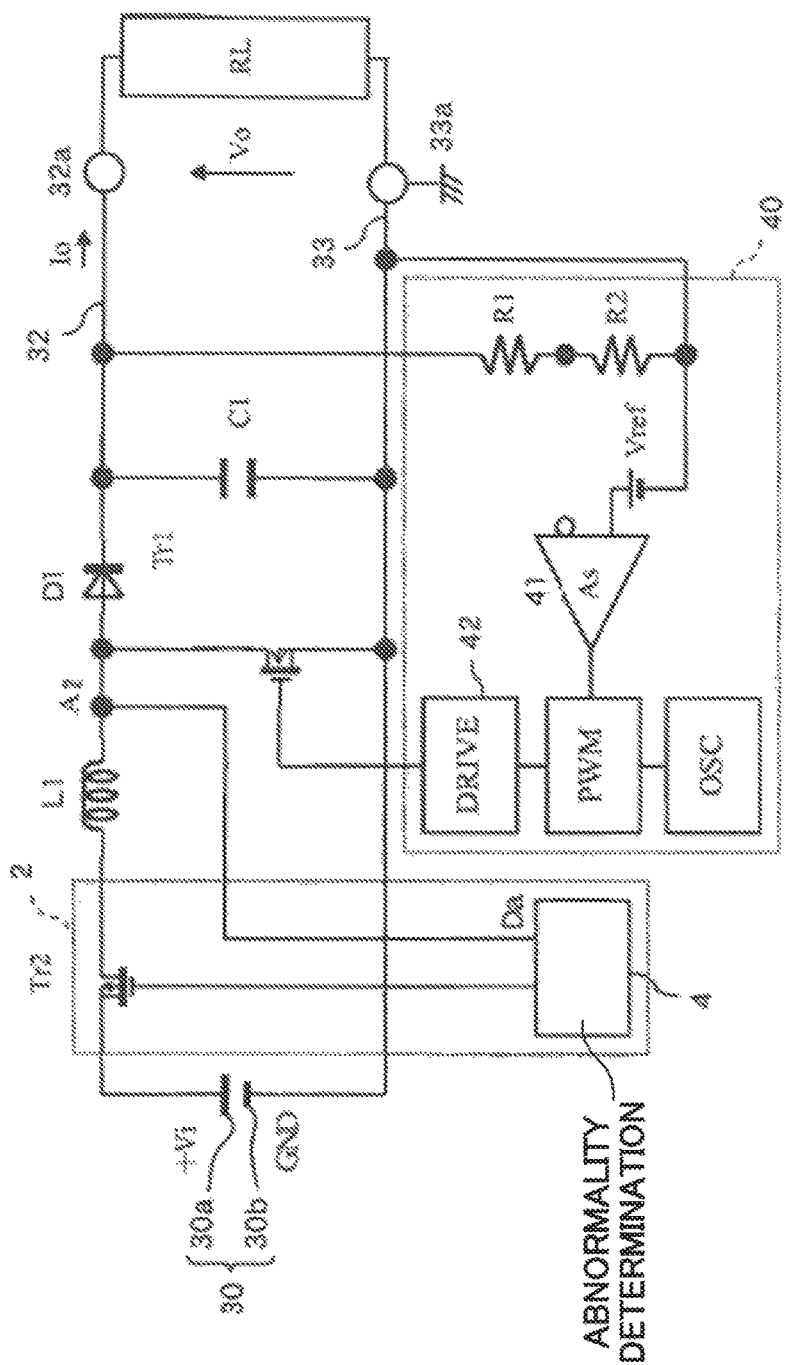
FIG. 5A is a circuit diagram of a step-up DC-DC converter 10 according to another embodiment.
Figure 5B:
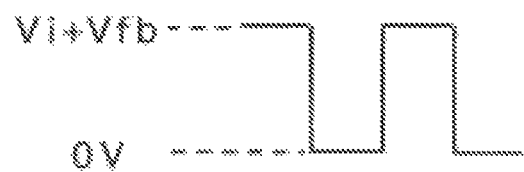
FIG. 5B is a main waveform chart at A2 when the switching transistor Tr1 in the step-up DC-DC converter 10 according to another embodiment is in normal switching operation.

FIGS. 5A and 5B illustrate a step-up DC-DC converter 10 according to another embodiment of the present invention for converting the direct current input voltage Vi to the direct current output voltage Vo with higher voltage. The elements that function the same as or similarly to the elements of the step-down DC-DC converter 1 illustrated in FIG. 1 are given the same reference numerals and their description is omitted.

As illustrated in FIG. 5A, in the step-up DC-DC converter 10, a closed circuit is formed by serially connecting the switching transistor Tr2, the inductor L1, and the switching transistor Tr1 as a main switching element between the high-tension side supply terminal 30a and the low-tension side supply terminal 30b of the direct current input power supply 30, and the diode D1 of which forward direction is the direction from a connecting point A2 between the switching transistor Tr1 and the inductor L1 to a high-tension side output terminal 32a is connected to the high-tension side output line 32. In the present embodiment, N-channel FET is used for the switching transistor Tr1.

When a driving signal to turn on the switching transistor Tr1 is output from the driving circuit 42, a current flows from the direct current input power supply 30 to the inductor L1, and when a driving signal to turn off the switching transistor Tr1 is output, a high induced voltage Vfb is generated in the inductor L1, and the capacitor C1 is charged to a charging voltage formed by adding the induced voltage Vfb to the input voltage Vi by a charging current flowing through the diode D1. The diode D1 blocks a discharge current flowing from the capacitor C1 during the switching transistor Tr1 is turned on, and maintains the charging voltage of the capacitor C1 to an electric potential formed by adding the induced voltage Vfb to the input voltage Vi. Since the charging voltage at both ends of the capacitor C1 is the output voltage Vo between output terminals 32a and 33a to which the load RL is connected, the step-up DC-DC converter 10 converts the input voltage Vi to the output voltage Vo formed by adding the induced voltage Vfb to the input voltage Vi.

When a driving signal of 0 V is output from the driving circuit 42 to the gate of the switching transistor Tr1, the switching transistor Tr1 is controlled to be off, and electrical energy accumulated in the inductor L1 becomes a charging current circulating through the diode D1 to charge the capacitor C1 with the same polarity as the charging voltage, and output voltage Vo (charging voltage of the capacitor C1) lowered by power consumption of the load RL is maintained during off-control time.

The step-up DC-DC converter 10 also includes the switching transistor Tr2 functioning as an emergency stop switch connected to the high-tension side supply terminal 30a and the switching transistor Tr1 via the inductor L1, and the protection circuit 2 with the same structure as that of the first embodiment in which the detection terminal Da of the abnormality determination circuit 4 is connected to the connecting point A2 at where the switching transistor Tr1 is connected to the inductor L1.

Since the electric potential Vd of the connecting point A2 varies between 0 V and Vi+Vfb as shown in FIG. 5B during normal switching operation of the switching transistor Tr1, the threshold voltage Vth to be compared by the comparator is set to any electric potential between 0 V and Vi+Vfb. Accordingly, the abnormality determination circuit 4 can detect operation of the switching transistor Tr1 in an active state, and outputs H level to the RS flip-flop circuit 5 to open the switching transistor Tr2.

Figure 6A:
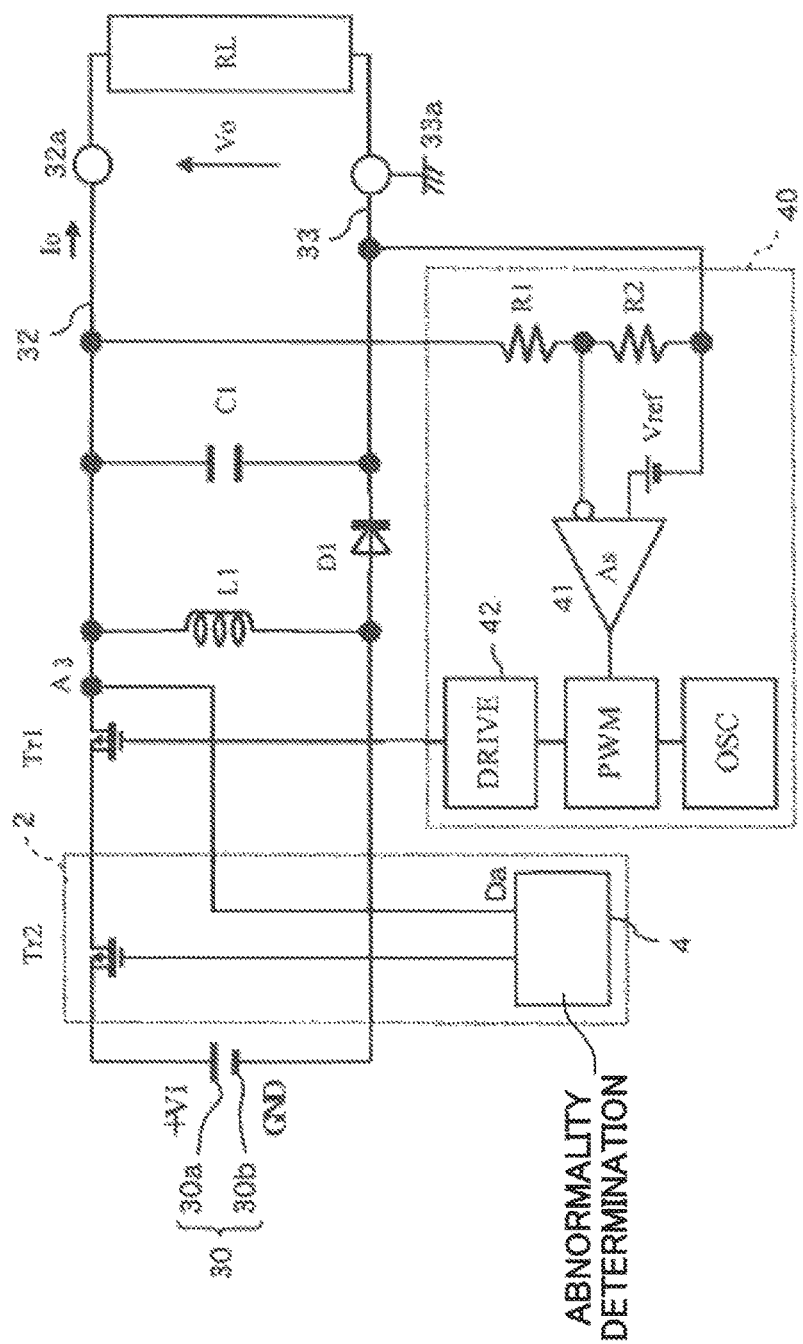
FIG. 6A is a circuit diagram of an inverted DC-DC converter 20 according to another embodiment.
Figure 6B:
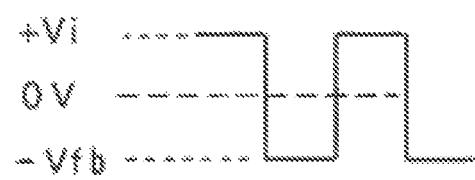
FIG. 6B is a main waveform chart at A3 when the switching transistor Tr1 in the inverted DC-DC converter 20 according to another embodiment is in normal switching operation.

FIGS. 6A and 6B illustrate the inverted DC-DC converter 10 according to still another embodiment of the present invention for converting the direct current input voltage Vi to the direct current output voltage Vo with the inverted polarity. The elements that functions the same as or similarly to the elements of the step-down DC-DC converter 1 illustrated in FIG. 1 are given the same reference numerals and their description sill be omitted.

As illustrated in FIG. 6A, in the inverted DC-DC converter 10, a closed circuit is formed by serially connecting the switching transistor Tr2, the switching transistor Tr1 as a main switching element, and the inductor L1 between the high-tension side supply terminal 30a and the low-tension side supply terminal 30b of the direct current input power supply 30. The diode D1 of which forward direction is from the connecting point between the low-tension side supply terminal 30b and the inductor L1 to the low-tension side output terminal 33a is connected to the low-tension side output line 33.

When a driving signal to turn on the switching transistor Tr1 is output from the driving circuit 42, a current flows from the direct current input power supply 30 to the inductor L1, and when a driving signal to turn off the switching transistor Tr1 is output, the high induced voltage Vfb is generated at a side where the inductor L1 is connected to the low-tension side supply terminal 30b, and the capacitor C1 is charged to the induced voltage Vfb by a charging current flowing through the diode D1. During the switching transistor Tr1 is turned on, the diode D1 blocks a discharge current flowing from the capacitor C1 and maintains the charging voltage of the capacitor C1 to an electric potential of the induced voltage Vfb. With respect to the polarity of the induced voltage Vfb as the charging voltage of the capacitor C1, the low-tension side output line 33 is higher than the high-tension side output terminal 32a and the direct current input voltage Vi is converted to the output voltage Vo of the induced voltage Vfb with the inverted polarity.

The inverted DC-DC converter 20 includes the protection circuit 2 with the same structure as the embodiment described above in which the switching transistor Tr2 is connected between the high-tension side supply terminal 30a and the switching transistor Tr1, and the detection terminal Da of the abnormality determination circuit 4 is connected to a connecting point A3 between the switching transistor Tr1 and the inductor L1.

During normal switching operation of the switching transistor Tr1, an electric potential of the connecting point A3 between the switching transistor Tr1 and the inductor L1 varies between the input voltage Vi during on-operation of the switching transistor Tr1 and the induced voltage −Vfb of the inductor L1 during off-operation of the switching transistor Tr1 as shown in FIG. 6B. Therefore, the threshold voltage Vth to be compared by the comparator is set to any electric potential between +Vi and −Vfb, and accordingly, the abnormality determination circuit 4 can detect operation of the switching transistor Tr1 in an active state and output H level to the RS flip-flop circuit 5 to open the switching transistor Tr2.

In the embodiment described above, a P-channel FET or N-channel FET is used for the switching transistors Tr1 and Tr2. However, an N-channel FET or P-channel FET in which a drain and a source are connected in opposite or a bipolar transistor may be used. In addition, the structure of the emergency stop switch is not limited to a transistor in so far as a current flowing from the direct current input power supply 30 to the switching transistor Tr1 can be blocked when the abnormality determination circuit 4 determines as operation of the switching transistor Tr1 in an active state.

Moreover, when the abnormality determination circuit 4 determines as operation of the switching transistor Tr1 in an active state, an alert system (not illustrated) may be activated together with or separately from open control of the emergency stop switch to notify the user of an abnormal operation state by warning sound or warning display.

Furthermore, the switching transistor Tr1 operates in an active state due to an abnormal driving signal in the embodiment described above. However, the present invention can be applied to a case in which the switching transistor Tr1 operates in an active state due to another cause such as failure of the switching transistor Tr1 itself or abnormal connection between circuit elements.

INDUSTRIAL APPLICABILITY

The embodiment of the present invention is suitable for a DC-DC converter in which a transistor is used for a switching element of a non-insulating DC-DC converter.

REFERENCE SIGNS LIST

1 Step-down DC-DC converter
2 Protection circuit
4 Abnormality determination circuit
10 Step-up DC-DC converter
20 Inverted DC-DC converter
30 Direct current input power supply
32 High-tension side output line
33 Low-tension side output line
40 Constant voltage control circuit
42 Driving circuit
Vi Input voltage
Vo Output voltage
L1 Inductor
Tr1 Switching transistor
Tr2 Switching transistor (emergency stop switch)
RL Load
C1 Capacitor (capacitor)
Td Detection time
T Period of driving signal

The invention claimed is:

1. A DC-DC converter comprising:
a switching transistor serially connected to a direct current input power supply and forming a closed circuit with the direct current input power supply;
a driving circuit for outputting a driving signal to open and close the switching transistor in a predetermined period to a control terminal of the switching transistor;
a capacitor connected between a pair of a high-tension side output line and a low-tension side output line connected to a load;
an inductor in which a current flowing from the direct current input power supply is interrupted by switching operation of the switching transistor and for converting an output voltage between the pair of the high-tension side output line and the low-tension side output line to a direct current voltage different from an input voltage of the direct current input power supply;
a constant voltage control circuit for controlling a close time of the switching transistor by the driving signal in accordance with the output voltage between the pair of the high-tension side output line and the low-tension side output line to control the output voltage to a constant voltage;
a comparator for comparing a voltage at a connecting point where the switching transistor is connected to the inductor with a threshold voltage arbitrarily set within a variation range of the voltage at the connecting point during switching operation of the switching transistor; and an abnormality determination circuit that determines as operation of the switching transistor in an active state when a polarity in which the voltage at the connecting point and the threshold voltage are compared by the comparator does not vary in a detection time longer than the predetermined period of the driving signal.

2. The DC-DC converter according to claim 1, further comprising a protection circuit for opening an emergency stop switch connected between the direct current input power supply and the switching transistor of the closed circuit when the abnormality determination circuit determines as operation of the switching transistor in an active state.

3. The DC-DC converter according to claim 1, wherein
the DC-DC converter is a step-down DC-DC converter in which the inductor converts the output voltage between the pair of the high-tension side output line and the low-tension side output line to a direct current voltage lower than the input voltage of the direct current input power supply, and the threshold voltage is set to any electric potential between −Vf and +Vi when diode drop of a diode connected between a low-tension side terminal of the direct current input power supply and the switching transistor of the closed circuit with a forward direction being a direction from the low-tension side terminal to the switching transistor is Vf and an input voltage of the diode is Vi.

4. The DC-DC converter according to claim 1, wherein
the DC-DC converter is a step-up DC-DC converter in which the inductor converts the output voltage between the pair of the high-tension side output line and the low-tension side output line to a direct current voltage higher than the input voltage of the direct current input power supply, and the threshold voltage is set to any electric potential between a grounding electric potential and +Vi+Vfb when an input voltage is Vi and an induced voltage generated in the inductor by opening the switching transistor is Vfb.

5. The DC-DC converter according to claim 1, wherein
the DC-DC converter is an inverted DC-DC converter in which the inductor converts the output voltage between the pair of the high-tension side output line and the low-tension side output line to a direct current voltage with a polarity different from the input voltage of the direct current input power supply, and the threshold voltage is set to any electric potential between −Vfb and +Vi when an induced voltage generated in the inductor by opening the switching transistor is Vfb and an input voltage is Vi.

* * * * *